United States Patent [19]

Fornetti et al.

[11] Patent Number: 5,715,763
[45] Date of Patent: Feb. 10, 1998

[54] COMBUSTION SYSTEM FOR A BLACK LIQUOR RECOVERY BOILER

[75] Inventors: Michael A. Fornetti; Timothy A. LeGault, both of Dayton, Ohio

[73] Assignee: The Mead Corporation, Dayton, Ohio

[21] Appl. No.: 526,172

[22] Filed: Sep. 11, 1995

[51] Int. Cl.[6] ............................................. F23G 7/04
[52] U.S. Cl. ........................................ 110/238; 110/346
[58] Field of Search ................................. 110/238, 346, 110/348

[56] References Cited

U.S. PATENT DOCUMENTS

| | | | |
|---|---|---|---|
| 2,594,267 | 4/1952 | Wilcoxson | 23/277 |
| 2,789,881 | 4/1957 | Hochmuth | 23/48 |
| 3,574,500 | 4/1971 | Huouvilainen et al. | 431/175 |
| 3,928,531 | 12/1975 | Boatwright et al. | 423/206 |
| 4,359,950 | 11/1982 | Leffler et al. | 110/188 |
| 4,545,308 | 10/1985 | Zaterka | 110/297 |
| 4,940,004 | 7/1990 | Jansen | 110/182 |
| 5,001,992 | 3/1991 | Higgins et al. | 110/182 |
| 5,007,354 | 4/1991 | Uppstu | 110/238 |
| 5,022,331 | 6/1991 | Simonen | 110/297 |
| 5,044,327 | 9/1991 | Hunt | 122/6 |
| 5,121,700 | 6/1992 | Blackwell et al. | 110/348 |
| 5,139,412 | 8/1992 | Kychakoff et al. | 431/12 |
| 5,305,698 | 4/1994 | Blackwell et al. | 110/348 |
| 5,368,471 | 11/1994 | Kychakoff et al. | 431/12 |
| 5,450,803 | 9/1995 | Svensk et al. | 110/238 |
| 5,478,440 | 12/1995 | Paju | 110/238 |
| 5,551,354 | 9/1996 | Crofut et al. | 110/238 |

FOREIGN PATENT DOCUMENTS

| | | |
|---|---|---|
| WO9216688 | 10/1992 | WIPO . |
| WO9305228 | 3/1993 | WIPO . |
| WO9412829 | 6/1994 | WIPO . |
| WO9417240 | 8/1994 | WIPO . |
| WO9518262 | 7/1995 | WIPO . |
| WO9518263 | 7/1995 | WIPO . |
| WO9525845 | 9/1995 | WIPO . |
| WO9535409 | 12/1995 | WIPO . |

OTHER PUBLICATIONS

Improved Air Systems for Modern Kraft Recovery Boilers, Pulp & Paper Canada (1987), pp. 122–125.

*Primary Examiner*—John T. Kwon
*Attorney, Agent, or Firm*—Thompson Hine & Flory LLP

[57] ABSTRACT

A black liquor recovery boiler furnace having quaternary air injection ports located in the furnace walls in the vicinity of, or at approximately the same elevation as, the black liquor injection guns. The quaternary air injection ports are located between the secondary air injection ports and the tertiary air injection ports. Air introduced at this level provides a much more efficient mixing and combustion without solid particle carryover. A zone of increased or intensified combustion is established around the black liquor injection guns. The injection site combustion zone is at an intermediate location to the combustion zones conventionally supplied by the secondary and tertiary air ports. In accordance with a preferred embodiment of the invention, the black liquor injection guns inject the black liquor into the furnace in a downwardly inclined direction. Still more preferably, the injection guns employ a splash plate which is oriented to cause the solid particles impinging the plate to flow downwardly in the furnace.

22 Claims, 3 Drawing Sheets

COMBUSTION SYSTEM FOR A BLACK LIQUOR RECOVERY BOILER

The present invention relates to kraft or black liquor recovery boiler furnaces and, in particular, to reducing solid particle carryover and plugging of the boiler tubes.

In the pulp and paper industries recovery boilers are used to burn the liquor produced in the kraft pulp making process. The function of a recovery boiler is to dispose of black liquor by burning the organic residue, generating steam, and converting the inorganic materials into a useful form. The current practice for introducing combustion air into the kraft recovery boilers involves injecting the air at two or more elevations in the furnace of the boiler. At the lowest elevation, air is injected through ports in all four walls. One of the major operational problems in kraft recovery boilers is the formation of deposits on the heat transfer surfaces in the upper part of the boiler. The most troublesome deposits occur in the superheater and steam generator. These deposits are formed mainly by particles that originate from the entrainment of some of the liquor spray particles in the air and flue gas stream. As the liquor spray particles fall towards the bottom of the furnace, they swell and lose weight, becoming less dense and easier to entrain. The most sensitive area for entrainment is at the char bed and the primary air entry level of the furnace. A second critical area is where there is a secondary level of air entry just above the char bed. The particles that are entrained are carried upward into the region above the black liquor injection nozzles by the upwardly flowing gases and are destined to be carried out of the furnace by the furnace exit gas or to be deposited in the superheater and steam generator.

The production of a pulp mill is integrally linked to the capacity of its recovery boiler. Recently, pulp mills have been increasing their level of production through improved process management and mill upgrades. These improvements are pushing recovery boiler performance requirements beyond their original design capacity. As a result, recovery boilers limit pulp mill output in many cases.

Almost all recovery boilers include three levels of combustion air known as primary, secondary and tertiary air. These air levels have different functions. The primary air is located at the lowest elevation in the furnace and supplies the air to burn the char on the surface of the char bed. The char is formed as liquor spray particles burn in the furnace. The char is partially burned in flight, as it falls to the bottom of the furnace, but the last part of the carbon in the char is burned out on top of the char bed that covers the bottom of the furnace. The primary air flow provides a bed geometry that allows recovered molten chemicals a suitable path for egress along the perimeter of the boiler and to the smelt outlet spouts. The floor of the boiler is sometimes sloped to facilitate this chemical removal.

Secondary air enters the boiler above the primary air and below the black liquor injection nozzles. The secondary air assists in shaping the top of the char bed and supplies air to burn the combustible gases which rise from the bed. If the secondary air flow is too high, the flue gas resulting from the combustion of the volatiles will carry liquor droplets to the upper furnace plugging the boiler unit. Tertiary air is introduced to the boiler at an elevation above the black liquor injection guns and is used principally to burn the volatiles that are driven off of the black liquor droplets as they pyrolyze and dry.

There have been numerous attempts to improve boiler efficiency by implementing complex control systems that affect air flow into the combustion chamber. See, for example, U.S. Pat. No. 5,121,700 to Blackwell; U.S. Pat. No. 5,305,698 to Blackwell; U.S. Pat. No. 4,940,004 to Jansen, and others.

SUMMARY OF THE INVENTION

In accordance with the present invention, in addition to secondary and tertiary air injection ports, quaternary air injection ports are located in the furnace in the vicinity of or at approximately the same elevation as the black liquor injection guns. While combustion dynamics and combustion reactions are complex and difficult to define, it is believed that air introduced at this level in the furnace provides a much more efficient mixing and combustion without solid particle carryover. In accordance with a preferred embodiment of the invention, the black liquor injection guns inject the black liquor into the furnace in a downwardly inclined direction. Still more preferably, the injection guns employ a splash plate which is oriented to cause the solid particles impinging the plate to flow downwardly in the furnace.

The term "quaternary air" is used herein to describe a new level of air introduction which results in increased combustion at substantially the level of the injection guns. Air previously introduced through the primary, secondary and/or tertiary air injection ports is, in part, redirected to the quaternary air injection sites. In accordance with the invention a zone of increased or intensified combustion is established around the black liquor injection guns. This zone is referred to herein as the "injection site combustion zone" and it generally extends a distance up to 4 feet below and up to about 4 to 6 feet above the injection guns and more specifically from about 2 feet below to about 4 feet above the black liquor injection guns. The quaternary air ports will usually be located in this zone, but in some cases they may be located just above this zone if the air is directed downwardly into the zone. The injection site combustion zone is at an intermediate location to the combustion zones conventionally supplied by the secondary and tertiary air ports. In this zone, the quaternary air supports efficient combustion of the combustible gases driven off of the drying black liquor droplets without entraining solid particles.

One of the most important advantages achieved in accordance with the invention is reduced carryover and, hence, reduced plugging of the boiler tubes. This, in turn, improves boiler efficiency and reduces the frequency with which the boiler must be shut down for cleaning. The following related advantages have also been observed: significantly improved chemical conversion efficiency, significantly improved thermal efficiency, lower total reduced sulfur emissions, more stable combustion, lower auxiliary energy requirements, increased run time between shutdowns, lower capital costs, improved air quality.

DETAILED DESCRIPTION OF THE INVENTION

Figure 1:
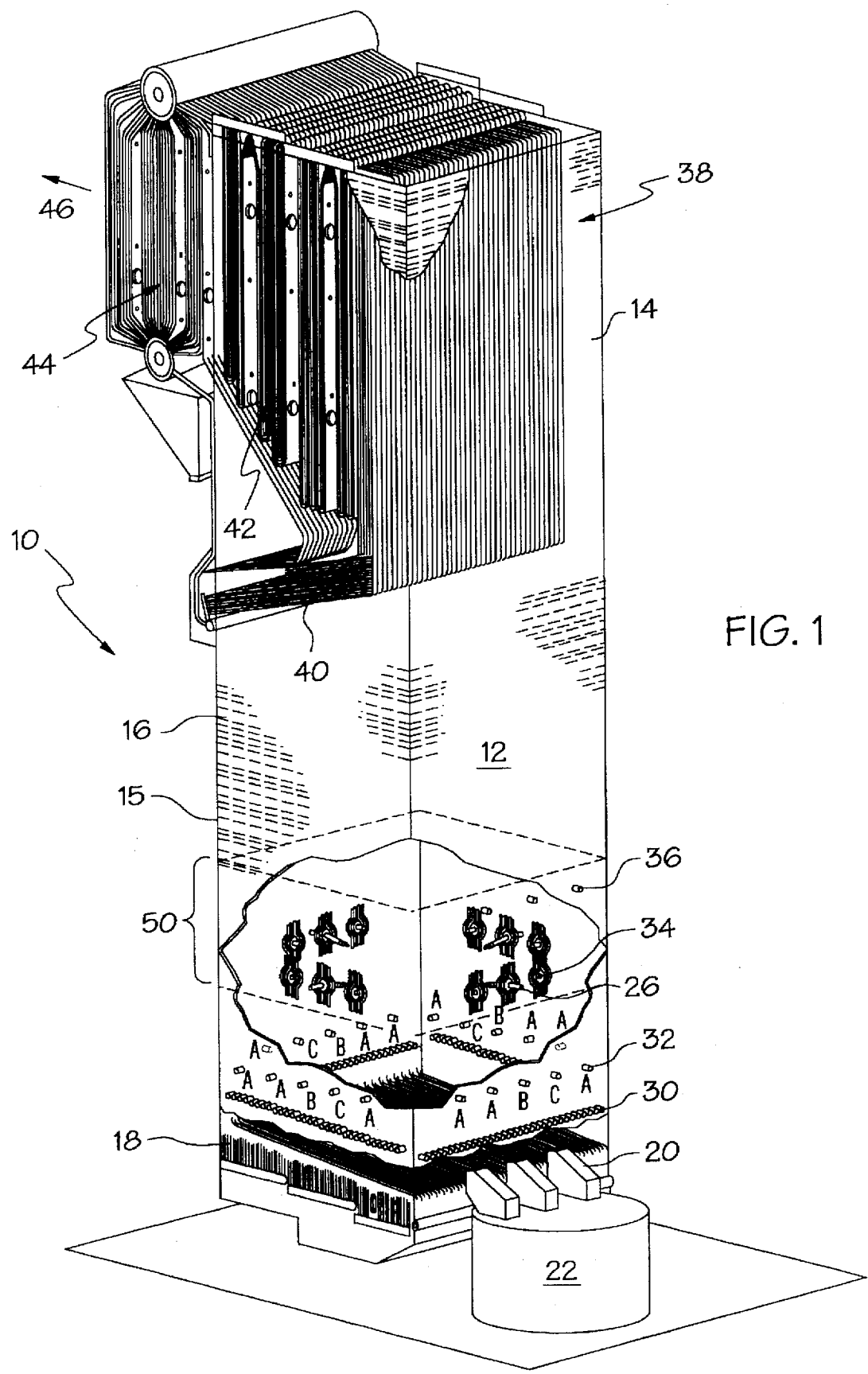
FIG. 1 is a schematic drawing of a boiler in accordance with one embodiment of the invention.
Figure 1A:
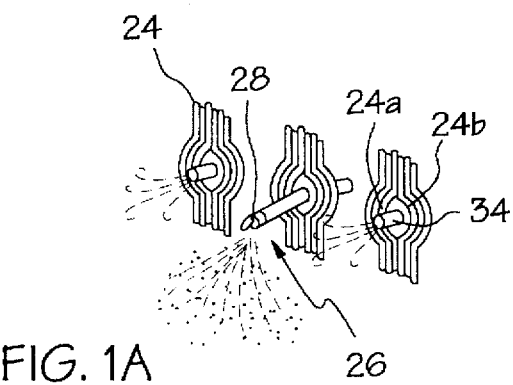

As shown in FIG. 1, a black liquor recovery unit, designated as 10, includes a furnace chamber 12 having vertical front and rear walls 14, 15 and vertical side walls 16 and at the lower end an inclined hearth 18. Molten smelt removal spouts 20 are positioned at the lower end of the hearth for the discharge of molten chemical ash into a smelt collection tank 22. As the black liquor droplets are burned, the so-called black ash expands to a light low density particle which falls to the hearth floor to form the char bed. Incomplete combustion in the char bed causes carbon and carbon monoxide to act as reducing agents, thus converting sulfate and thiosulfate to sulfide. The heat is sufficient to melt the sodium salts, which filter through the char bed to the floor of the furnace. The smelt then flows by gravity through the water cooled spouts 20 to the smelt collection tank 22.

The walls 14, 15, 16 are cooled by rows of water tubes 24 extending the entire surface of the walls. The tubes 24 may also extend through the floor, the hearth, and the roof of the furnace. The steam generator 38 generally comprises a tube screen 40, a super heater section 42, a boiler section 44 and a boiler outlet 46. The steam generator tubes are used for the generation of superheated steam.

Figure 2:
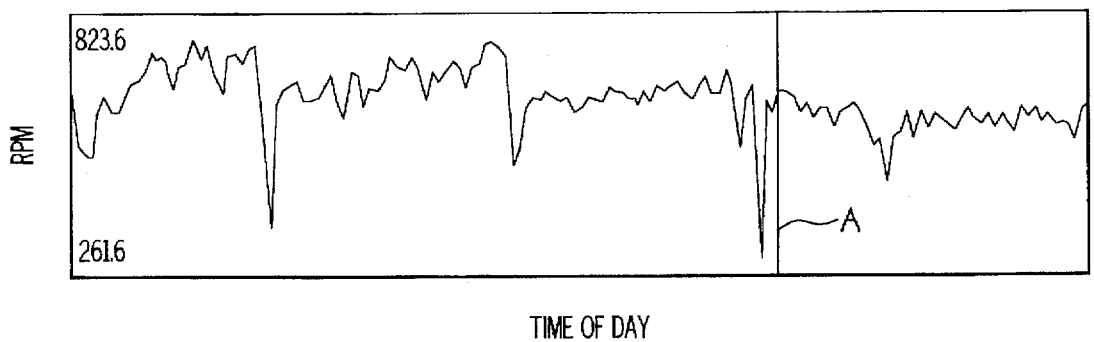
FIG. 2 is a chart showing induced draft fan speed (rpm) at various times for a boiler operating first without and then with quaternary air injection ports.

As shown in FIGS. 1 and 2, black liquor injection guns 26 are mounted in each of the four furnace walls and are inclined downwardly so as to inject the black liquor into the furnace in a downward direction. Each of the injection guns 26 preferably includes a splash plate 28 attached to the spout of the injection guns oriented to cause the solid particles impinging the plate to flow downwardly into the furnace. While the invention is illustrated with an injection gun in each of the furnace walls, those skilled in the art will appreciate that embodiments are also possible in which there is more than one gun present in each wall or in which there is one gun present in each of two opposing walls and no gun or a different number of guns present in the other walls.

In accordance with the invention an injection site combustion zone 50 is created in the furnace 12. Air is introduced into the furnace through four sets of ports designated from the bottom upward as primary 30, secondary 32, quaternary 34, and tertiary 36 air ports. As can be seen in FIG. 2, the injection guns 26 and air ports 30, 32, 34, 36 all extend through openings or bent tube ports defined by boiler tubes 24a and 24b. In a typical boiler installation in accordance with the invention, the boiler will include primary and quaternary air ports. In most embodiments, secondary air ports will also be present. However, tertiary air ports may not be present and the need for them will in many cases be obviated by the use of quaternary air ports in accordance with the invention.

The air ports are supplied with combustion air by wind boxes which are not shown but are essentially large box like ducts that are mounted on and surround the outside wall of the combustion chamber. Pressurized air flow is provided to the wind boxes by a fan. The amount of air supplied to the air ports can be regulated by dampers. Typically each set of air ports will be supplied from a separate wind box and fan but constructions are also feasible in which two or more sets of air ports are supplied from a common wind box. The air ports are positioned and operated or dampened to reduce the formation of deposits on the heat transfer surfaces and especially the superheater in the upper part of the boiler by minimizing gas velocity extremes including the chimney effect.

The primary air ports 30 are located conventionally a few feet (about 2 to 4 feet) above the hearth 18 and extend around the four walls to provide a large portion of the combustion air requirement. The primary air ports 30 also provide an air flow geometry that allows the formation of the char bed such that the molten smelt has a suitable path for egress along the perimeter of the hearth 18 to the smelt outlet spouts 20. The primary air ports are operated in a conventional manner in accordance with the invention.

The secondary air ports 32 are positioned conventionally about 6 to 8 feet above the primary air 30 and about 8 feet below the injection guns 26, and extend around the four walls of the furnace. The secondary air ports are operated to shape the top of the char bed and burn combustible gases which rise from the char bed in a conventional manner. With the use of the quaternary air ports, in many cases the amount of air supplied to the furnace by means of the secondary air ports can be reduced. Typically, 18 to 25% of the total air requirement is injected through the secondary air ports when using quaternary air introduction in accordance with the invention as contrasted with flows of up to 40% when quaternary air ports are not used.

Quaternary air ports 34 are preferably positioned substantially at the same level as or above the injection guns 26 so as to supply air directly to zone 50. The number of quaternary air ports can vary but there will typically be one port located on each side of each of the black liquor injection guns. The air supplied by the quaternary air ports provides efficient mixing and combustion within the injection site combustion zone 50 of the boiler furnace 12. The quaternary air location is selected to concentrate the air more closely to where the fuel is located and provide better mixing and combustion, thus producing a more efficient burn in the combustion chamber, but without or with less particle entrainment. It is preferred that two quaternary air ports 34 are positioned adjacent to each side of each injection gun 26. Typically, the quaternary air ports will be positioned a distance to the side of each gun of about 2 to 10 feet. Preferably, the quaternary air ports 34 are positioned at substantially the same level as the injection guns 26, but the position of the quaternary air injection ports can range from a distance of up to 5 feet above the guns to a distance no more than 0 to 4 feet below the guns. Preferably the quaternary air injection ports are located at the same level as or at a higher level than the black liquor guns. The height of the quaternary air ports will depend on the design of the air ports and the injection guns. It has been found that when the guns include the splash plate shown in FIG. 2, the quaternary air ports can be located a small distance below the guns without producing particle entrainment. While the quaternary air ports are typically located in the injection site combustion zone, if the air ports are designed to inject the air downwardly into the injection site combustion zone, they can be located above the zone and direct air downwardly into the zone.

The function of the quaternary air ports is not to be confused with the function of the tertiary air ports which are located a greater distance above the injection guns than the quaternary air ports. It is believed that air injected through the quaternary air ports reacts more efficiently with the gaseous combustibles which are released from the black liquor as it burns because the quaternary air is supplied at a point at which the combustibles are more highly concentrated. By contrast, at the conventional level for tertiary air, the combustibles are believed to be diluted with noncombustible gases. However, there may be other theories for the improved reaction.

Tertiary air ports 36 are positioned about 10 to 14 feet above the injection guns 26. In FIG. 1 they are located on the front and rear walls 14, 15 of the furnace but they could also be located on the side walls. Tertiary air is used principally to burn volatiles that are driven off the black liquor droplets, sprayed from the injection guns 26, as the liquor is pyrolyzed and dried. About 30 to 40% of the total air requirement is injected through the combined tertiary and quaternary air ports. Typically, about 15% of the total air is injected through the tertiary air ports and about 15 to 30% of the total air is injected through the quaternary air ports. Thus, in accordance with the invention, at least 30% of the total air flow is injected at or above the black liquor guns. This relocation or reallocation of the air flow is advantageous because it reduces the amount of oxygen at the lower elevations of the boiler where chemical reduction is favored and increases it in the upper portions of the boiler where oxidation is desired. While such flow rates may have previously been achieved through increased tertiary air introduction without quaternary air introduction, it was probably not as efficient and involved more excess air then quaternary air introduction in accordance with this invention.

The black liquor injection guns are preferably equipped with a splash plate which directs the black liquor droplets downward. The injection guns 26 and angle of the splash plate are selected to produce a downward particle flow and to minimize particle entrainment. Combustion of the black liquor is accompanied by a volume change caused by gas expansion. This expansion can lead to particle entrainment. The splash plates appear to be very effective in preventing entrainment in the presence of the quaternary air. The black liquor is supplied at a concentration of about 65 to 80% solids.

The addition of the quaternary air ports 34 affords the opportunity to reduce secondary air 32 by performing some of the secondary air functions at the quaternary air level. In some cases it has been possible to block approximately seventy percent of the secondary air dampers. Preferably, the secondary air dampers are arranged as shown in FIG. 1. Secondary air dampers marked A are closed, secondary air dampers marked B are open, and secondary air dampers marked C are 50% open.

In a typical embodiment of the invention, the operation of the furnace is as follows. The black liquor is fed through the injection guns at a rate of about 275 gal/min and is introduced at concentrations of about 70% solids. The primary air is introduced through primary air ducts on each of the front and rear furnace walls 14, 15 and on each of the side walls 16. The primary air is fed at a rate of 45% total air flow. The secondary air is introduced through the secondary air ducts on each of the furnace walls as described above. The secondary air is fed at a rate of 25% of total air. The quaternary air is introduced through two quaternary air ducts on each side of the black liquor injection guns, at a rate of about 15% of total air. The quaternary air flow rate will typically vary from 15 to 35% of total air. The tertiary air can be introduced through tertiary air ducts on both the front and rear walls of the furnace, at a rate of 15 to 30% of total air which is sufficient to complete combustion of the gases released from the pyrolyzing liquor.

Figure 3:
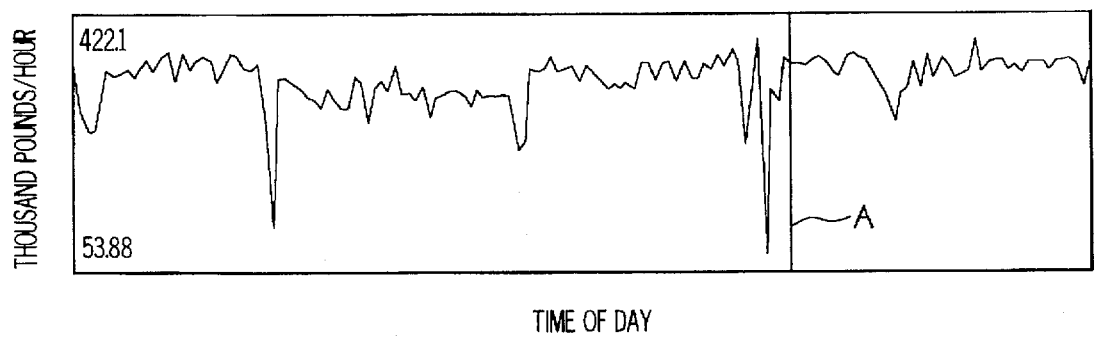
FIG. 3 is a chart showing primary air flow rates at various times for a boiler operating first without and then with quaternary air injection ports.
Figure 4:
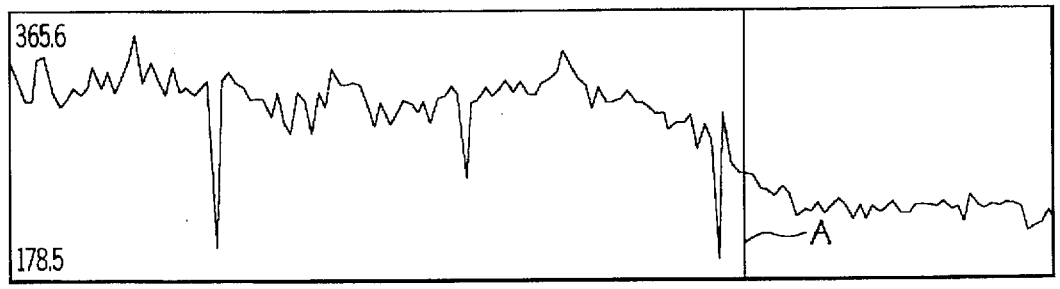
FIG. 4 is a chart showing secondary air flow rates at various times for a boiler operating first without and then with quaternary air injection ports.
Figure 5:
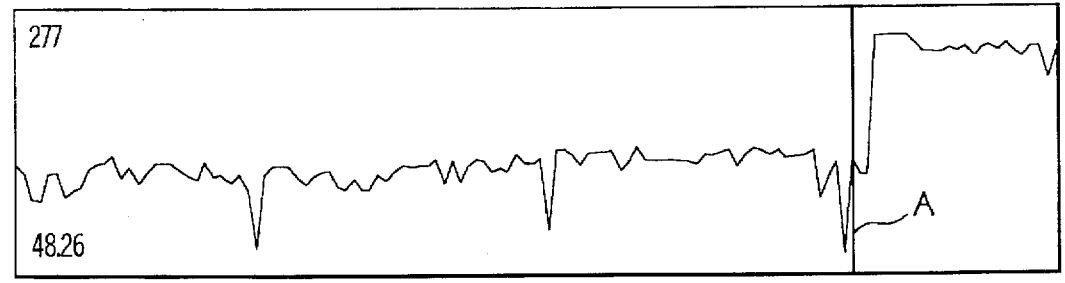
FIG. 5 is a chart showing tertiary air at various times for a boiler operating first without and then with quaternary air injection ports.
Figure 6:
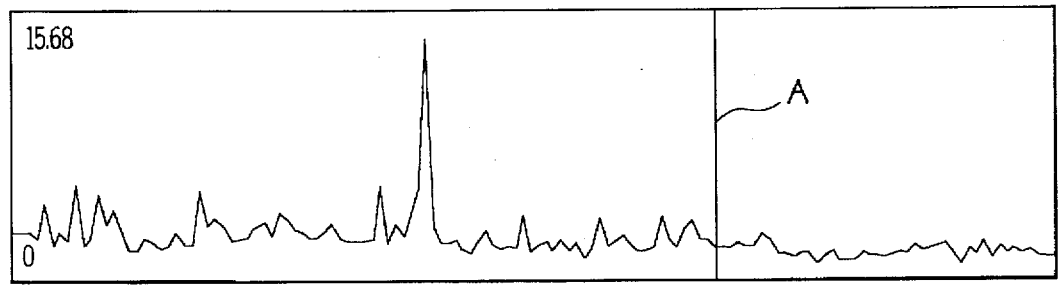
FIG. 6 is a chart showing total reduced sulfur at various times for a boiler operating first without and then with quaternary air injection ports.

FIGS. 2–6 are operating charts respectively showing induced draft fan speed, primary air flow rate, secondary air flow rate, combined tertiary and quaternary air flow rate and total reduced sulfur for a boiler which was initially operated without quaternary air and subsequently with quaternary air. The boiler is a Babcock and Wilcox boiler having a design pressure of 1625 psig and a designed liquid firing rate of 2.4 million pounds per day dry solids operating at a firing rate of 3.05 million pounds per day. The increase in the air flow rate shown on the right hand side of line A in FIG. 5 as compared with the left side is the quaternary air flow. Specifically, the air flow to the left of line A in FIG. 5 is tertiary air and the air flow to the right is the sum of tertiary and quaternary air. The quaternary air was about 20% of the total air flow. FIG. 2 shows that using quaternary air, the total air demand of the boiler as determined by draft fan speed (rpm) is reduced about 10%. The operation to the left of the line A is without quaternary air and to the right of the line is with quaternary air. A comparison of the operation to the right and left of line A in FIGS. 3 and 4 shows that primary air was not substantially affected by the use of quaternary air but secondary air flow can be reduced about 20 to 30% of the total air. Total reduced sulfur (TRS) shown is a measure of the efficiency of the boiler. FIG. 6 shows that TRS (ppm) is higher and more variable without quaternary air flow.

Having described the invention in detail with reference to specific embodiments thereof, it will be apparent that numerous modifications and variations thereof are possible without departing from the scope of the invention as defined by the following claims.

We claim:

1. A kraft recovery boiler furnace comprising: a furnace chamber having four walls, a char bed, a plurality of black liquor injection guns on at least two of the walls of the furnace chamber for injecting droplets of black liquor into the furnace, a plurality of primary air injection ports located at a lower elevation in the walls of said furnace for burning the char on the surface of the char bed, the secondary air assists in shaping the top of the char bed and supplies air to burn the combustible gases that rise from the char bed, and tertiary air is used principally to burn volatiles; and the furnace being characterized in that an injection site combustion zone is defined surrounding the black liquor injection guns, and in that a plurality of quaternary air injection ports are located in the walls of said furnace in or above the injection site combustion zone, the primary, secondary, tertiary and quaternary air injection ports being arranged in distinct groups which are vertically separated from one another by areas in the furnace walls in which essentially no air is introduced into the furnace, such that in operation air injection through the quaternary air injection ports is introduced into the injection site combustion zone and reacts with gaseous fuel released from the black liquor without substantially entraining the solid fuel from the black liquor.

2. The furnace of claim 1 wherein the black liquor injection guns inject black liquor into said furnace in a downwardly inclined direction.

3. The furnace of claim 2 wherein the black liquor injection guns include a splash plate for downwardly deflecting liquor injected into the furnace through the gun.

4. The furnace of claim 2 wherein the black liquor injected through said black liquor injection guns contains about 68 to 80% solids.

5. The furnace of claim 1 wherein the furnace additionally includes a plurality of secondary air injection ports in the walls, said secondary air injection ports being located above said primary air injection ports and below said black liquor injection guns and said injection site combustion zone.

6. The furnace of claim 5 wherein the air injection ports are adjusted such that about 30 to 40% of the total amount of air injected into the furnace is injected through the tertiary and quaternary air injection ports.

7. The furnace of claim 1 wherein said furnace additionally includes a plurality of tertiary air injection ports in the walls, said tertiary air injection ports being located above said black liquor injection guns and above said quaternary air injection ports and said injection site combustion zone.

8. The furnace of claim 7 wherein the flow of air through said secondary and quaternary air injection guns is adjusted to prevent the chimney effect.

9. The furnace of claim 8 wherein said air injection ports are adjusted such that about 18 to 25% of the total amount of air injected into said furnace is injected through the secondary air injection ports.

10. The furnace of claim 1 wherein said injection site combustion zone extends a distance not substantially greater than 6 feet above and 4 feet below said black liquor injection guns.

11. The furnace of claim 1 wherein said quaternary air injection ports are located at approximately the same elevation as said black liquor injection guns.

12. The furnace of claim 1 wherein there is one black liquor injection gun on two opposing walls of said furnace and there are two quaternary air injection ports located on each side of said black liquor injection guns.

13. The furnace of claim 1 wherein there is a black liquor injection gun located in each wall of said furnace and there are quaternary air injection ports located on each side of said black liquor injection guns.

14. The furnace of claim 1 wherein said secondary air injection ports are baffled.

15. A method for introducing air into a kraft recovery boiler furnace comprising introducing air into the furnace through a plurality of quaternary air injection ports positioned in the walls of said furnace such that the air is introduced into an injection site combustion zone surrounding the black liquor injection guns.

16. The method of claim 15 wherein said quaternary air injection ports are located at approximately the same elevation in the furnace as the black liquor injection guns.

17. The method of claim 15 wherein said primary, secondary, tertiary and quaternary air injection ports are baffled such that about 30 to 40% of the total amount of air injected into the furnace is injected through said tertiary and said quaternary air injection ports.

18. The method of claim 15 wherein said method includes the step of injecting black liquor into said furnace in a downwardly inclined direction.

19. The method of claim 18 wherein the black liquor is injected into the furnace below the quaternary air injection ports.

20. The method of claim 15 wherein the method includes the additional step of adjusting the flow of air into the furnace to minimize entrainment of the black liquor and to prevent the chimney effect.

21. The method of claim 20 wherein the furnace includes a bed of combustibles which burns and creates gaseous fuel which exits upwardly through said chamber.

22. In a kraft recovery boiler furnace comprising a furnace chamber having four walls, a char bed, a plurality of black liquor injection guns on at least two of the walls of the furnace chamber for injecting droplets of black liquor onto the furnace, an injection site combustion zone surrounding the black liquor injection guns, and a plurality of primary air injection ports located at a lower elevation in the walls of said furnace for supplying primary air which burns the char on the surface of the char bed, secondary air injection ports located between the primary air injection ports and the black liquor injection guns, the secondary ports supplying secondary air which assists in shaping the top of the char bed and supplying air to burn the combustible gases that rise from the char bed, tertiary ports located at an elevation above the black liquor injection guns, the tertiary ports being used principally to burn volatiles; the improvement wherein a plurality of quaternary air injection ports is located in the walls of said furnace below the tertiary air ports, such that air injected through the quaternary air injection ports is introduced into the injection site combustion zone and reacts with gaseous fuel released from the black liquor without substantially entraining the solid fuel from the black liquor.

* * * * *